United States Patent
Dong et al.

(10) Patent No.: US 12,288,313 B2
(45) Date of Patent: Apr. 29, 2025

(54) LOW-LATENCY ARCHITECTURE FOR FULL FREQUENCY NOISE REDUCTION IN IMAGE PROCESSING

(71) Applicant: ADVANCED MICRO DEVICES, INC., Santa Clara, CA (US)

(72) Inventors: YongMei Dong, Beijing (CN); Hui Zhou, Shanghai (CN); ZhongFei Dong, Anhui (CN); Tsung-Han Chiang, Hsinchu (TW)

(73) Assignee: Advanced Micro Devices, Inc., Santa Clara, CA (US)

( * ) Notice: Subject to any disclaimer, the term of this patent is extended or adjusted under 35 U.S.C. 154(b) by 210 days.

(21) Appl. No.: 17/561,865

(22) Filed: Dec. 24, 2021

(65) Prior Publication Data

US 2023/0206399 A1    Jun. 29, 2023

(51) Int. Cl.
  *G06T 5/70* (2024.01)
  *G06T 1/60* (2006.01)
  (Continued)

(52) U.S. Cl.
  CPC ............... *G06T 5/70* (2024.01); *G06T 1/60* (2013.01); *G06T 3/4053* (2013.01); *G06T 5/20* (2013.01);
  (Continued)

(58) Field of Classification Search
  CPC ......... G06T 5/002; G06T 1/60; G06T 3/4053; G06T 5/20; G06T 2207/10024; G06T 2207/20016; G06T 2207/20221
  See application file for complete search history.

(56) References Cited

U.S. PATENT DOCUMENTS

| | | | |
|---|---|---|---|
| 7,257,271 B2 * | 8/2007 | Adams, Jr. ............. | G06T 5/002 382/167 |
| 9,111,339 B1 * | 8/2015 | Huang .................... | G06T 5/002 |

(Continued)

OTHER PUBLICATIONS

International Search Report and Written Opinion issued in Application No. PCT/US2022/052136, mailed Apr. 20, 2023, 11 pages.
(Continued)

*Primary Examiner* — Said Broome
*Assistant Examiner* — Donna J. Ricks (57) ABSTRACT

Systems and techniques provide for low-latency, full-frequency noise filtering of images through the use of an image-scaling-based filtering technique, or "multiscale filtering technique", that can provide filtering for low, medium, and/or high frequencies for one or more components of an image, such that the different resolution scales at each level of the multiscale filtering technique provides a larger receptive field for a denoising process employed at each level than a conventional denoising framework. This multiscale filtering includes receiving an input image to be filtered and then performing a multiscale filtering process in which an input image is, at different resolution scales, denoised, downscaled, upscaled, and fused with a result of a lower resolution scale, to generate a filtered image. This may include temporarily buffering intermediate image data for some of the resolution scales at a memory using direct memory access (DMA) operations.

23 Claims, 6 Drawing Sheets

(51) Int. Cl.
*G06T 3/4053* (2024.01)
*G06T 5/20* (2006.01)
(52) U.S. Cl.
CPC ............... *G06T 2207/10024* (2013.01); *G06T 2207/20016* (2013.01); *G06T 2207/20221* (2013.01)

(56) References Cited

U.S. PATENT DOCUMENTS

| | | | |
|---|---|---|---|
| 9,916,637 B1* | 3/2018 | Smirnov | G06T 1/20 |
| 2001/0024531 A1* | 9/2001 | Edgar | G06T 5/002 |
| | | | 382/254 |
| 2013/0322753 A1* | 12/2013 | Lim | G06T 5/002 |
| | | | 382/167 |
| 2015/0317772 A1 | 11/2015 | Lim et al. | |
| 2016/0205405 A1 | 7/2016 | Ten | |
| 2021/0042899 A1 | 2/2021 | Smirnov et al. | |
| 2021/0304366 A1 | 9/2021 | Kim | |
| 2021/0390341 A1 | 12/2021 | Zhang | |
| 2022/0254050 A1* | 8/2022 | Smirnov | G06T 7/90 |

OTHER PUBLICATIONS

International Preliminary Report on Patentability issued in Application No. PCT/US2022/052136, mailed Jul. 4, 2024, 8 pages.

* cited by examiner

LOW-LATENCY ARCHITECTURE FOR FULL FREQUENCY NOISE REDUCTION IN IMAGE PROCESSING

BACKGROUND

Image processing for a captured image often involves filtering of the image for low-frequency, medium-frequency, and high-frequency noise. However, low-frequency noise filtering typically requires a relatively large filtering window and thus incurs a relatively high cost in the hardware implementation in terms of complexity, power, and latency. Real-time image capture applications, such as video streaming, that require rapid image processing further inhibit the ability to effectively implement full-frequency noise filtering at reasonable costs.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Real-time image capture and processing, such as found in live video streaming applications, requires low-latency filtering processes in order to achieve an indicated frame rate. Conventional approaches either rely on a heavy software compute load and thus typically introduce significant latency or require a large filter window in hardware-based solutions, and thus are often impracticable for implementation in low cost or low power systems, such as mobile phones. The present disclosure thus describes systems and techniques for low-latency, low-cost full-frequency noise filtering of images through the use of an image-scaling-based filtering technique, or "multiscale filtering technique", that can provide filtering for low, medium, and/or high frequencies (that is, "full-frequency") for one or more components (e.g., chrominance and/or luminance) of an image, such that the different resolution scales at each level of the multiscale filtering technique provides a larger receptive field for a denoising process employed at each level than a conventional denoising framework. The present disclosure further provides a hardware architecture for implementing the multiscale filtering technique in hardware (that is, hardcoded and/or programmable logic) that leverages intermediate data storage in memory and targeted partitioning of in-out memory data flow to provide lower latency and lower complexity.

As described in greater detail below, this multiscale filtering includes receiving an input image to be filtered (e.g., the chrominance portion of a captured image) and then performing a multiscale filtering process in which an input image is, at different resolution scales, denoised, downscaled, upscaled, and fused with a result of a lower resolution scale, to generate a filtered image. In some embodiments, this includes temporarily buffering intermediate image data for some of the resolution scales at a memory using direct memory access (DMA) operations.

More specifically, in some embodiments, this process includes recursively performing, for each level of a plurality of levels (e.g., resolution scales) in a first sequence, a denoising operation on an image received from a previous level in the first sequence followed by a downsampling operation on a resulting denoised image, followed by an upsampling operation on a resulting downsampled image, and then followed by a residue operation that subtracts a resulting upsampled image at the level from the denoised image at the level to generate a residue image for the level. The process then further includes recursively performing, for each level of the plurality of levels in a second sequence opposite of the first sequence, an upscaling operation to upscale a fused image from a previous level, followed by a fusion operation to combine a resulting upscaled image with the residue image of a next level in the second sequence to generate a fused image for the level. The resulting filtered image is then provided for at least one of storage, transmission, display or encoding. To illustrate one embodiment, for a given level of the plurality of levels in the first sequence, the recursive process includes receiving an output image from a previous level in the first sequence, performing a denoising operation to generate a denoised image, downsampling the denoised image to generate a downsampled image, providing the downsampled image as an output image to the next level in the first sequence, upsampling the downsampled image to generate an upsampled image, and subtracting the upsampled image from the denoised image to generate a residue image for the level. Further, in some embodiments, for the given level, the process can further include storing the denoised image of the level to a memory using at least one direct memory access operation, storing the downsampled image of the level to the memory using at least one direct memory access operation, accessing the downsampled image of the level from the memory using at least one DMA operation for use in upsampling the downsampled image to generate the upsampled image, and accessing the denoised image for the level from the memory using at least one DMA operation for use in subtracting the upsampled image from the denoised image. Receiving the output image from a previous level can include accessing the denoised image of the previous level from the memory using at least one DMA operation, the accessed denoised image being the output image from the previous level. Conversely, for given a level of the plurality of levels in the second sequence, the recursive process includes upscaling a fused image from a previous level in the second sequence to generate an upscaled fused image and combining the upscaled fused image with the residue image of the level to generate a fused image for use at a next level in the second sequence.

Figure 1:
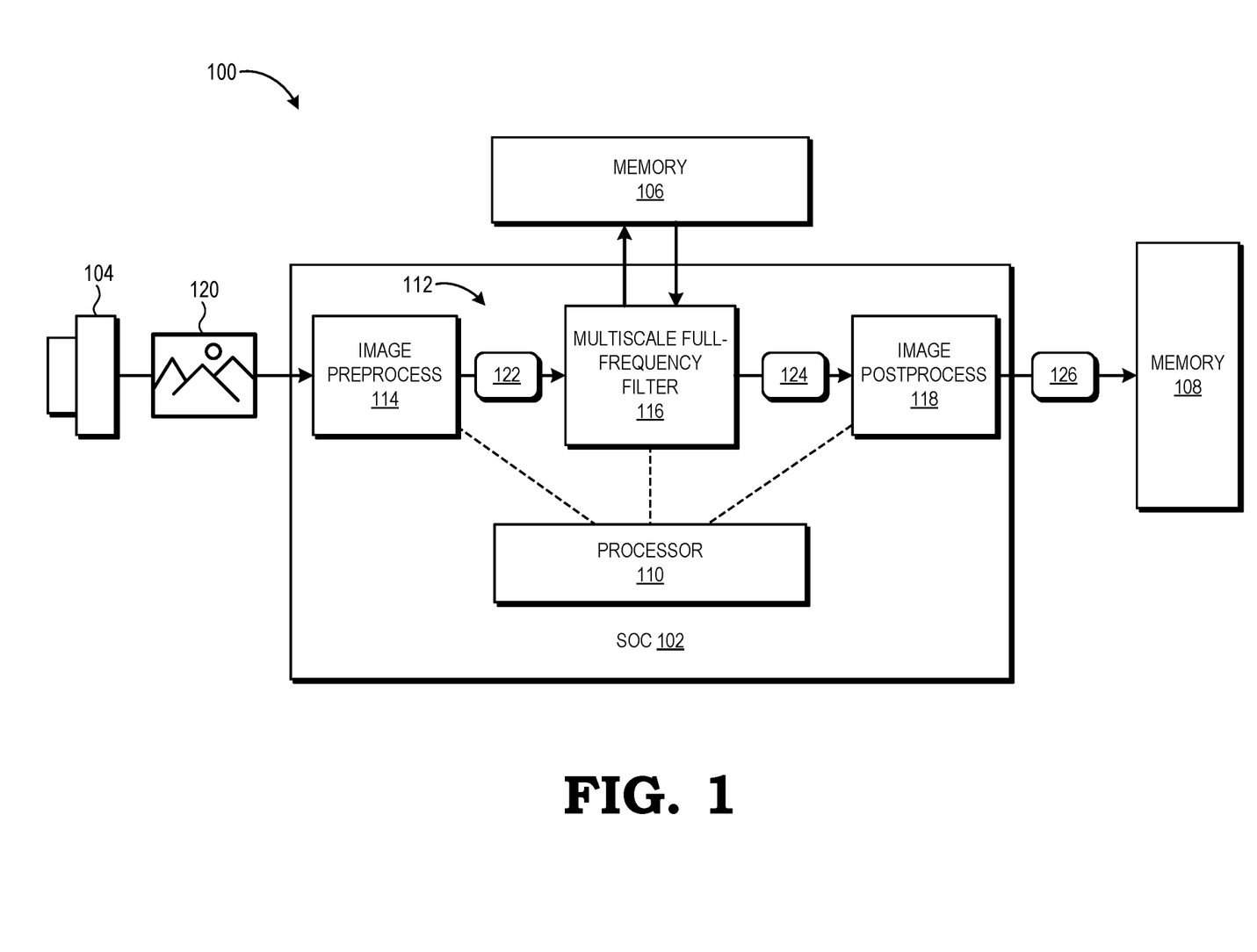
FIG. 1 is a block diagram of an image processing system implementing a low-latency multiscale full-frequency filtering process in accordance with some embodiments.

FIG. 1 illustrates an image capture and processing system 100 (hereinafter, "system 100") employing a multiscale full-frequency filtering process in accordance with some embodiments. The system 100 can be implemented in any of a variety of electronic devices for providing real-time image capture and/or video streaming. Such devices include, for example, mobile phones, laptop computers, desktop computers, video cameras, still image cameras, vehicle navigation systems, and the like.

The system 100 may represent any of a variety of electronic devices, such as a smart phone, personal computer, laptop computer, tablet computer, video gaming console, vehicular information system, and the like. The system 100 includes a system on a chip (SOC) 102 or other collection of one or more integrated circuit (IC) dies. The SOC 102, in one embodiment, is connected to an imaging camera 104 and memories 106 and 108 (e.g., dynamic random access memories (DRAMs), static random access memories (SRAMs), or a combination thereof). Note that while FIG. 1 depicts memories 106 and 108 as separate memories, as described below, in some embodiments the memory 106 and memory 108 comprise the same memory. The SOC 102 includes one or more processors 110 (e.g., one or more central processing units (CPUs), one or more graphics processing units (GPUs), or a combination thereof) and other hardware to implement an image processing pipeline 112. The image processing pipeline 112 includes an image preprocessing stage 114, a multiscale full-frequency filter stage 116 (hereinafter, "multiscale filter stage 116" for brevity), and an image postprocessing stage 118. The stages 114-118 may be implemented via one or more processors 110 executing software to implement their functionality described herein, as hardcoded logic and/or programmable logic of the SOC 102, or a combination thereof. The system 100 further can include an output, such as a network interface, USB interface, HDMI interface, and the like, that is coupleable to a display device for output of a filtered display image for display at the display device. As described in greater detail below with reference to FIG. 3, in at least one embodiment, the multiscale filter stage 116 is implemented using a hardware micro-architecture that implements a multiscale noise filtering process via an efficient data flow and uses the memory 106 as intermediate storage that is accessed via one or more direct memory access (DMA) engines so as to reduce latency in the data flow and present to a user an image having perceived improved qualities due to the noise reduction process.

Figure 2:
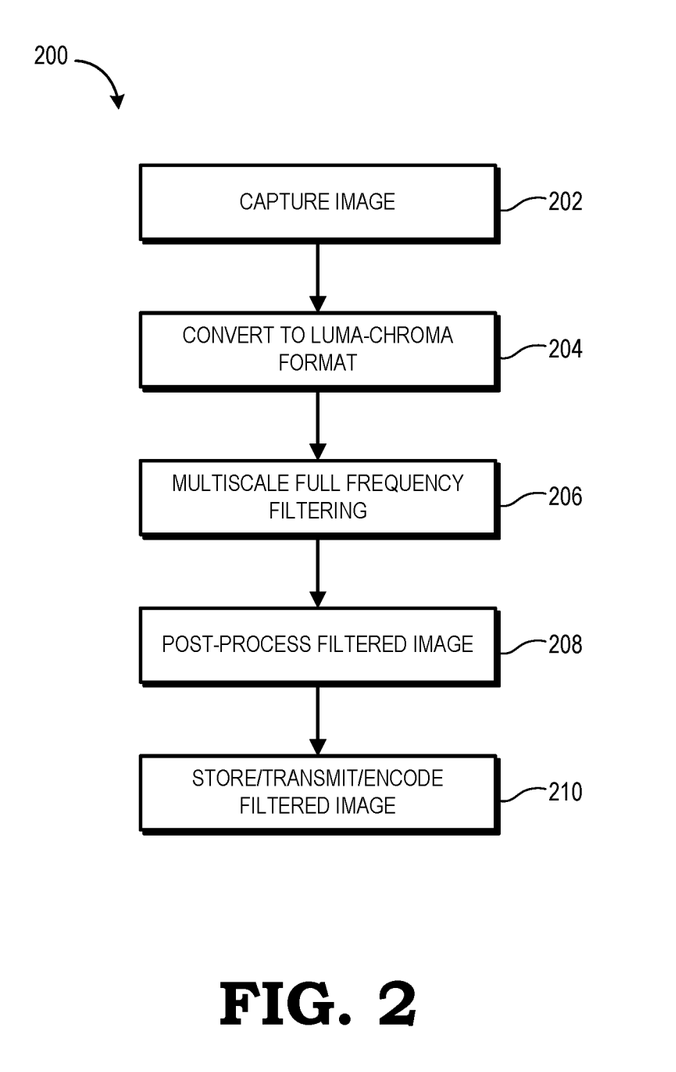
FIG. 2 is a flow diagram illustrating a high-level view of the image capture and filtering process of the system of FIG. 1 in accordance with some embodiments.

FIG. 2 illustrates a method 200 illustrating a high-level operation of the image processing pipeline 112 of the system 100 of FIG. 1 in accordance with some embodiments. An iteration of the method 200 initiates at block 202 with the capture of an image 120 (FIG. 1) by the imaging camera 104, either as a still image or as an image in a sequence of images for a video stream. The image data of the image 120 is read out from the imaging camera 104, either into a frame buffer (not shown) implemented in SRAM or other internal memory of the SOC 102 or into one of the memories 106, 108. Typically, the image data represented in the captured image 120 is presented in a raw format in which the pixel data represents the radiometric characteristics of the scene captured in the image 120. Accordingly, at block 204 the image preprocessing stage 114 converts the image data from the raw format to a luminance-chrominance format more suitable for noise filtering to generate a pre-processed image 122 (FIG. 1). For the following, the luminance-chrominance format is described in the example context of a YUV (or YCrCb) format, in which "Y" represents the luma, or luminance, component and UV represent the chrominance format. However, other luminance-chrominance formats, instead may be employed using the guidelines provided herein. Further, although not illustrated, the image preprocessing stage 114 can employ additional image processing techniques, such as color correction or antialiasing, in preparing the resulting pre-processed image 122.

At block 206, the pre-processed image 122 is input to the multiscale filtering stage 116, whereupon the multiscale filtering stage 116 performs a multiscale full-frequency noise filtering (or "denoising") process to filter two or more of low, medium, or high-frequency noise in the pre-processed image 122. This process is described in greater detail below with reference to FIGS. 3-6. The resulting filtered image 124 is then provided to the image postprocessing stage 118 for postprocessing at block 208. This postprocessing can include, for example, conversion of the format or color space of the filtered image 124 (e.g., from YUV to red-blue-green (RGB) format), upscaling, downscaling, trimming, etc. At block 210, the resulting processed image 126 (FIG. 1) is provided to a downstream component in the system 100, such as by being stored in an unencoded format in the memory 108 for further postprocessing, by being encoded and then stored in an encoded format in the memory 108, by being encoded and transmitted via a network to another device, by being displayed on a display via an output coupleable to the display, and the like.

Figure 3:
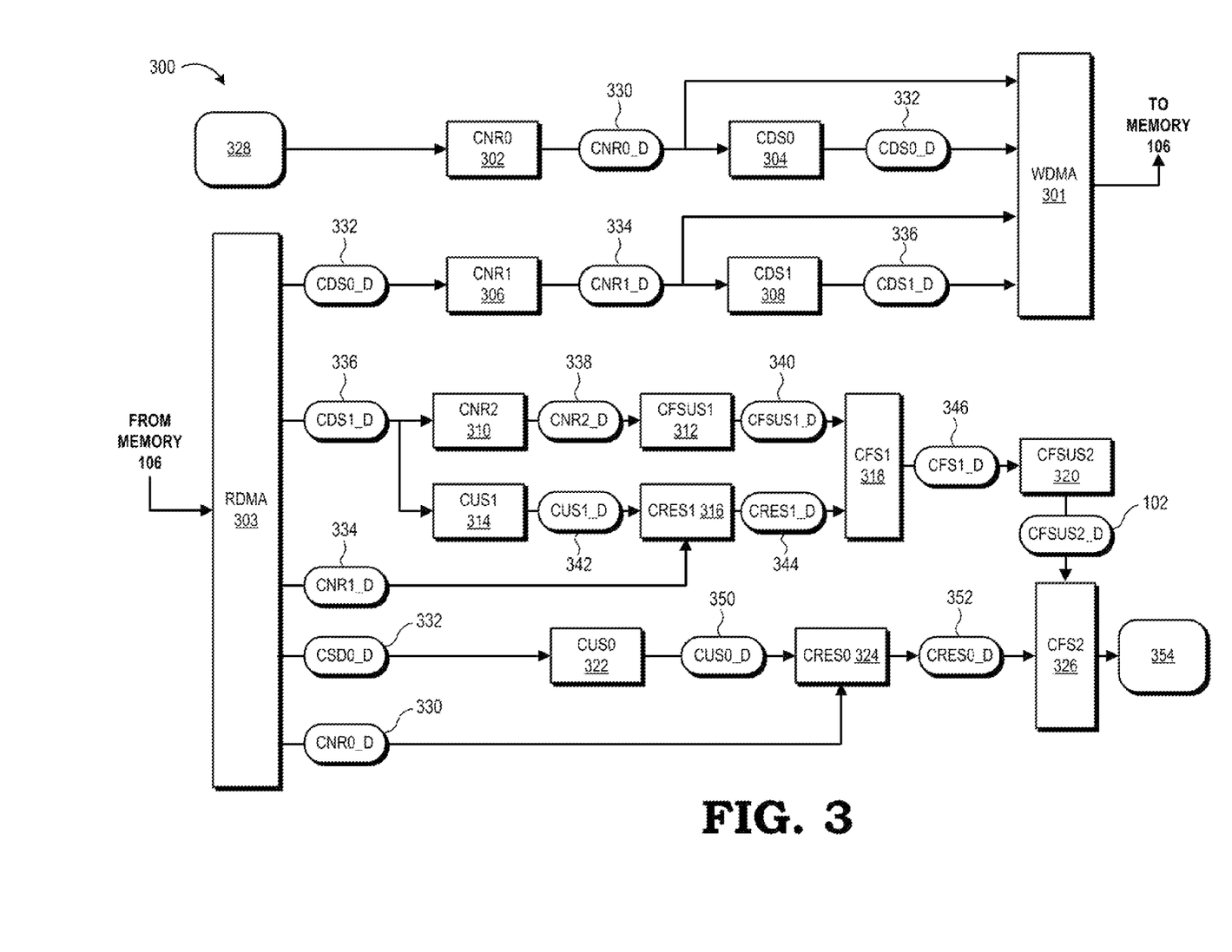
FIG. 3 is a diagram illustrating a hardcoded hardware architecture implementing the low-latency multiscale full-frequency filtering process of the system of FIG. 1 in accordance with some embodiments.

FIG. 3 illustrates a hardware architecture 300 implemented by the multiscale filtering stage 116 to implement a full-frequency multiscale noise filtering process as described in greater below with reference to FIGS. 4-6. However, as a general overview to facilitate understanding of the functions of the components of the hardware architecture 300 at this point, the multiscale filtering process employs multiscale modeling, in which multiple models of a system (in this case, the image being filtered) are processed at different scales (in this case, different image resolution scales). In this approach, the multiscale filtering process implements a first sequence of levels and then a second sequence of the levels opposite the first sequence. The first sequence starts with two or more scaled filtering levels. At each scaled filtering level in the first sequence, a noise filtering process (such as a non-local mean noise filtering process) is applied to a downsampled version of the image from the previous scaled filtering level (or to the original input image if the level is the first scaled filtering level) to generate a noise-filtered image for that level. The noise-filtered image is then downscaled to generate a downscaled image for that level, with the downscaled image thus keeping the low-frequency content. The downscaled image is then upscaled back to the same resolution as the noise-filtered image for that level, and the resulting upscaled image for that level is then subtracted from the noise-filtered image for that level to generate residual data for that level. The residual data for a level represents the high-frequency content of the image at the scale of that level. In the second sequence (referred to as a fusion level), the noise-filtered image of the last scaled filtering level is upscaled to the scale of the previous level. The upscaled version of that image is then combined, or "fused" with the residual data generated at the corresponding level. The resulting fused image is then upscaled again to the scale of the next highest level in the second sequence and the resulting upscaled image is then fused with the residual data generated at that next highest level. This process repeats recursively for each successively higher scaled filtering level in the second sequence until the residual data is combined with the upscaled version of the fused image from the next-lower level to generate the final fused image. This final fused image is then output as an output filtered image (e.g., filtered image 124).

Thus, as this overview illustrates, the multiscale filtering process has a data flow that utilizes intermediate data to be buffered between operations and between levels in the scaled sequences. Accordingly, to improve data flow efficiency and latency, the multiscale filtering stage 116 employs the memory 106 as intermediate storage for such data during the multiscale filtering process, and thus the hardware architecture 300 employs a write DMA (WDMA) engine 301 and a read DMA (RDMA) engine 303 coupled to the memory 106. The WDMA engine 301 is configured to receive image data from various functional blocks as described herein and to write the received image data to the memory 106 via corresponding DMA operations. The RDMA engine 303 is configured to access image data stored in the memory 106 via corresponding DMA operations (i.e., read from memory 106) and to provide the accessed image data to various functional blocks as described herein. In some embodiments, the WDMA engine 301 and RDMA engine 303 are separate DMA engines that operate independently to write image data to the memory 106 and to read data from the memory 106, respectively. In other embodiments, the WDMA engine 301 and RDMA engine 303 are implemented in the same DMA engine (that is, in a single DMA engine), and in such instances references to the WDMA engine 301 or to the RDMA engine 303 are references to the write DMA configuration or the read DMA configuration, respectively, of this single DMA engine.

The hardware architecture 300 of the multiscale filtering stage 116 further includes a plurality of functional blocks interconnected with each other and with the WDMA engine 301 and RDMA engine 303 to implement the multiscale filtering process briefly described above and described in more detail below with reference to FIGS. 3-6, with each functional block implementing the hardcoded logic and/or programmable logic and associated circuitry to implement a corresponding operation of a corresponding level of the multiscale filtering process. In the following example, the multiscale filtering process employs three scaled filtering levels (levels 0-2) and a final fusion (FS) level.

For these functional blocks and the resulting image data generated by the functional blocks, the following naming convention is employed: for all blocks, the initial "C" represents "chrominance" as the filtering process is applied to the chrominance component of the image data in this example. For blocks labeled CNRx, CDSx, CUSx, CRESx, the "NR" stands for noise reduction operation, "DS" stands for "downsampling" operation, "US" stands for "upsampling" operation, and "RES" stands for "residue calculation" operation, where the number represented by "x" represents the level at which the corresponding operation is performed, with level 0 being the initial scaled filtering level, level 1 being the intermediate scaled filtering level, and level 2 being the final scaled filtering level. Thus, a functional block labeled CNR0 indicates that the functional block performs the noise reduction operation for the initial scaled filtering level, while a functional block labeled CRES1 indicates that the functional block performs the residue calculation operation for the intermediate scaled filtering level. For blocks labeled CFUSx or CFSx, the "FUS" stands for "fusion upscale" operation to upscale the image from the next-lower level, and the "FS" stands for "fusion" operation, and x represents the number of fusion upscale operations or fusion operations being performed thus far. Further, in this naming convention, the image data output by a given functional block is referenced with an "_D" appended to the name accorded to the functional block that generated the output image data. For example, "CRES0_D" references the residue data generated by the residue operation performed by the CRES0 functional block. To further facilitate differentiation between the functional blocks and the data generated by the functional blocks, the functional blocks are represented in FIG. 3 using blocks with square corners, while data generated by a functional block is represented using a block with rounded corners.

As shown, the hardware architecture 300 includes functional blocks 302, 304, 306, 308, 310, 312, 314, 316, 318, 320, 322, 324, and 326. In the following example, the functional blocks operate on the chrominance information of the preprocessed image 122 as a reflection of the observation that the human eye typically is more capable of perceiving digital noise in the chrominance information of an image than in the luminance information of that same image and thus full-frequency denoising is typically more effective in the chrominance domain than in the luminance domain. Under this approach, the hardware architecture 300 can be duplicated so that each of the chrominance channels (e.g., the U channel and the V channel) is processed by a corresponding instance of the hardware architecture 300 in parallel with the other channel, or the hardware architecture 300 may be employed to implement the multiscale filtering process in sequence, once for the U channel and then again for the V channel (or vice versa). In still other embodiments, this same process may be employed for the luminance information, either individually or in combination with the processing of the chrominance information.

Starting at the input, the functional block 302 (denoted "CNR0 302") is implemented at the initial scaled filtering level (level 0) and has an input to receive the chrominance information for preprocessed image 122. This chrominance information itself can be viewed as an image of sorts, and thus is referred to herein as chrominance image 328. The chrominance image 328 can be provided as an input to CNR0 302 either directly from an output of the image preprocessing stage 114 or via one of the memories 106, 108 via either DMA access or via regular memory controller read operations. CNR0 302 further includes an output to provide a noise-reduced (or "denoised") image CNR0_D 330 based on one or more noise reduction operations performed by CNR0 302 on the chrominance image 328 to remove the high-frequency content before proceeding to the next sub-process. For example, a non-local-means (NLM) denoising operation can be employed as the denoising operation. However, other denoising operations also may be used, such as local-means denoising, bilateral denoising, guided filter denoising, wavelet denoising, and the like. The output of CNR0_302 is coupled to an input of the WDMA engine 301 such that the denoised image CNR0_D 330 is stored to the memory 106 via one or more write DMA operations. The output of CNR0 302 is also coupled to an input of the functional block 304 (denoted CDS0 304), which is also implemented at level 0 and operates to apply a downscaling operation on the denoised image CNR0_D 330 to produce a downscaled image CDS0_D 332 at the output, which is coupled to the WDMA engine 301 and thus is stored to the memory 106 via one or more write DMA operations. The original resolution of the image 122 is identified herein as OR and the degree of downscaling implemented by this operation at level 0 is denoted as DS0. For example, DS0 can represent a 50% downscaling of the original resolution, or DS0=0.5*OR (for both the vertical and horizontal resolutions) however, other downscaling ratios can be employed.

The functional block 306 (denoted "CNR1 306") is implemented at the intermediate scaled filtering level (level 1) and has an input to receive the downscaled image CDS0_D 332 as accessed by the RDMA engine 303 from the memory 106 via one or more DMA operations at the appropriate time.

CNR1 306 further includes an output to provide a noise-reduced (or "denoised") CNR1_D image based on one or more noise reduction operations performed by CNR1 306 on the downscaled image CDS0_D 332. This denoising operation can be the same type of operation (e.g., NLM noise reduction) as performed at CNR0 302 or a different type of noise reduction operation. The output of CNR1 306 is coupled to an input of the WDMA engine 301 such that the denoised image CNR1_D 334 is stored to the memory 106 via one or more write DMA operations. The output of CNR1 306 is also coupled to an input of the functional block 308 (denoted CDS1 308), which is also implemented at level 1 and operates to apply a downscaling operation on the denoised image CNR1 336 to produce a downscaled image CDS1_D 336 at its output, which is coupled to the WDMA engine 301 and thus is stored to the memory 106 via one or more write DMA operations. The degree of downscaling implemented by this operation at level 1 is denoted as DS1, where DS1>DS0. For example, DS1 can represent, for example, a 50% downscaling of the downscaled, denoised image 334 and thus a 75% downscaling of the original resolution OR, or DS1=0.25*OR (for both the vertical and horizontal resolutions).

The functional block 310 (denoted CNR2 310) is implemented at the final scaled filtering level (level 2) and has an input coupled to an output of the RDMA engine 303 to receive the downscaled image CDS1_D 336 retrieved by the RDMA engine 303 from the memory 106 via one or more DMA operations at the appropriate time. CNR2 310 further includes an output to provide a noise-reduced (or "denoised") image 338 (denoted "CNR2_D 338") based on one or more noise reduction operations performed by CNR2 310 on the downscaled image CDS1_D 336. This denoising operation can be the same type of operation as performed at CNR0 302 or a different type of noise reduction operation. The functional block 312 (denoted CFSUS1 312) is implemented as the fusion level and has an input coupled to the output of CNR2 310 to receive the denoised image CNR2_D 338 and operates to apply an upscaling operation on the denoised image CNR2_D 338 to produce an upscaled image CFSUS1_D 340 at its output. The degree of upscaling is denoted as FUS1 and is configured to, in effect, reverse the degree of downscaling DS1 applied to the downscaled image CDS1_D 336 (that is, FUS1=1/(1−DS1)). Thus, if the downscaling DS1 results in a 50% reduction in resolution, the upscaling FUS1 would provide a 200% increase in resolution in the resulting upscaled image CFSUS1_D 340.

The functional block 314 (denoted CUS1 314) is implemented at the intermediate filtering level (level 1) and has an input coupled to an output of the RDMA engine 303 to receive the downscaled image CDS1_D 336 retrieved by the RDMA engine 303 from the memory 106 for input to CNR2 310 in parallel. CUS1 314 operates to apply an upscaling operation on the downscaled image CDS1_D 336 to produce an upscaled image CUS1_D 342 at its output. The degree of upscaling is denoted as US1 and is configured to, in effect, reverse the degree of downscaling DS1 applied to the downscaled image CDS1_D 336 (that is, US1=FS1=1/(1−DS1)). Thus, if the downscaling DS1 results in a 50% reduction in resolution, the upscaling US1 would provide a 200% increase in resolution in the resulting upscaled image CUS1_D 342. The functional block 316 (denoted CRES1 316) is implemented at level 1 and has an input coupled to the output of CUS1 314 to receive the upscaled image CUS1_D 342 and an input coupled to an output of the RDMA engine 303 to receive the denoised image CNR1_D 334 retrieved by the RDMA engine 303 from the memory 106 via one or more DMA operations at the appropriate time. CRES1 316 operates to subtract the upscaled image CUS1_D 342 from the denoised image CNR1_D 334 to generate residue image CRES1_D 344 (which thus maintains the high-frequency signal while stripped of the lower-frequency signal) for output.

The functional block 318 (denoted CFS1 318) is implemented at the fusion level and has an input coupled to the output of CFSUS1 312 to receive the upscaled image CFSUS1_D 340, an input to receive the residue image CRES1_D 344, and operates to superimpose, or combine, the images 340 and 344 to generate a fused image CFS1_D 346. The functional block 320 (denoted CFSUS2 320) is also implemented at the fusion level and has an input coupled to the output of CFS1 318 to receive the fused image CFS1_D 346 and operates to apply an upscaling operation on the fused image CFS1_D 346 to produce an upscaled image CFSUS2_D 348 at its output. The degree of upscaling is denoted as FUS2 and is configured to, in effect, reverse the degree of downscaling DS0 applied to the downscaled image CDS0_D 332 (that is, FUS2=1/(1−DS0)). Thus, if the downscaling DS0 results in a 50% reduction in resolution, the upscaling FUS1 would provide a 200% increase in resolution in the resulting upscaled image CFSUS2_D 348.

The functional block 322 (denoted CUS0 322) is implemented at the initial scaled filtering level (level 0) and has an input coupled to an output of the RDMA engine 303 to receive the downscaled image CDS0_D 332 retrieved by the RDMA engine 303 from the memory 106 at the appropriate time. CUS0 322 operates to apply an upscaling operation on the downscaled image CDS0_D 332 to produce an upscaled image CUS0_D 350 at its output. The degree of upscaling is denoted as US0 and is configured to, in effect, reverse the degree of downscaling DS0 applied to the downscaled image CDS0_D 332 (that is, US0=FUS0=1/(1−DS0)). Thus, if the downscaling DS0 results in a 50% reduction in resolution, the upscaling US0 would provide a 200% increase in resolution in the resulting upscaled image CUS0_D 350. The functional block 324 (denoted CRES0 316) is implemented at level 0 and has an input coupled to the output of CUS0 322 to receive the upscaled image CUS0_D 350 and an input coupled to an output of the RDMA engine 303 to receive the denoised image CNR0_D 330 retrieved by the RDMA engine 303 from the memory 106 via one or more DMA operations at the appropriate time. CRES0 324 operates to subtract the upscaled image CUS0_D 350 from the denoised image CNR0_D 330 to generate residue image CRES0_D 352 (which thus maintains the high-frequency signal while stripped of the lower-frequency signal) for output.

The functional block 326 (denoted CFS2 326) is implemented at the fusion level and has an input coupled to the output of CFSUS2 312 to receive the upscaled image CFSUS2_D 348, an input to receive the residue image CRES0_D 352, and operates to superimpose, or combine, the images 348 and 352 to generate a filtered chrominance image 354, which comprises the chrominance component of the filtered image (124) that is then output to the image postprocessing stage 118, either directly or via intermediate storage in memory 106 or memory 108.

Figure 4:
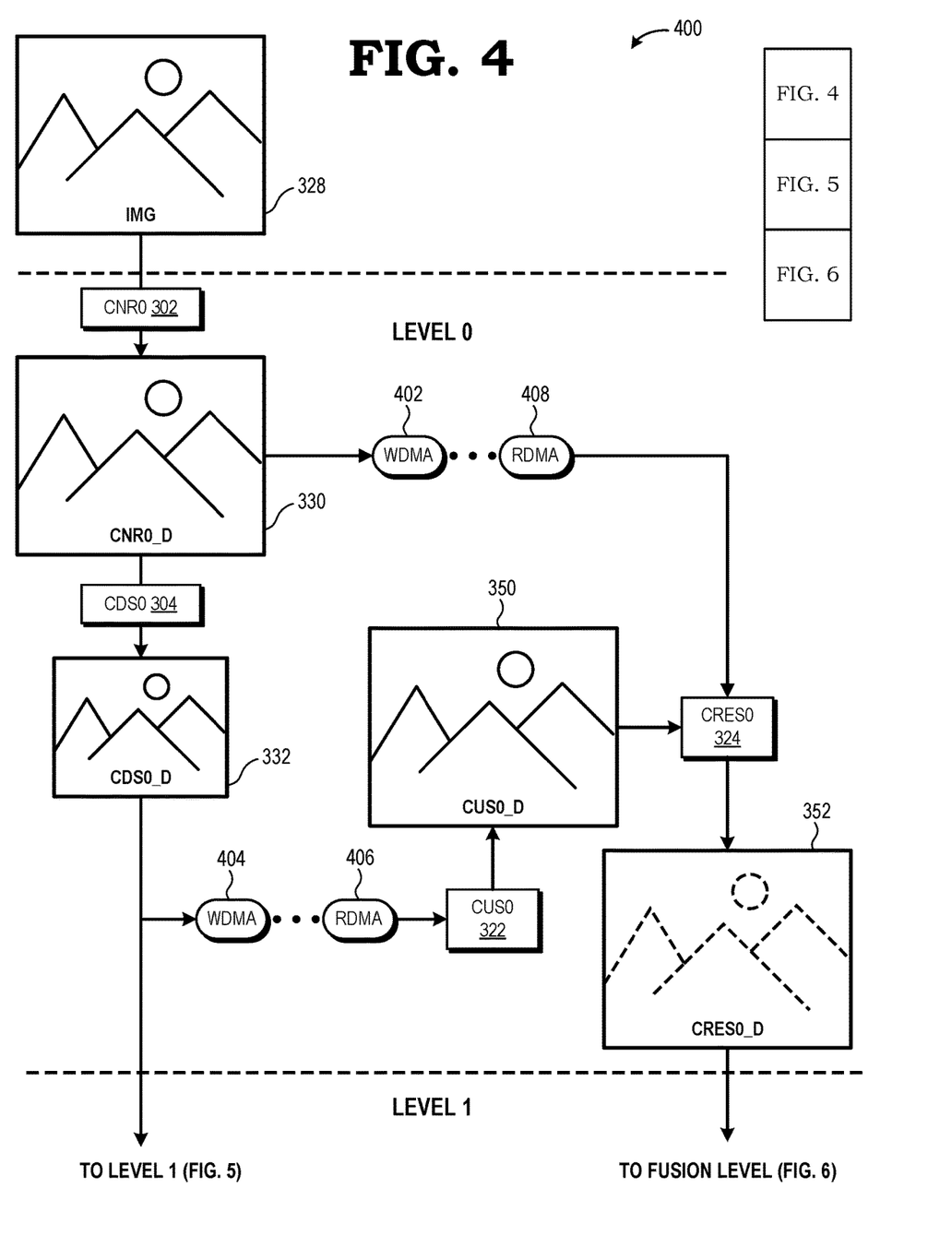
FIGS. 4-6 together illustrate an example operation of the multiscale full-frequency filtering process using the hardware architecture of FIG. 3 in accordance with some embodiments.
Figure 5:
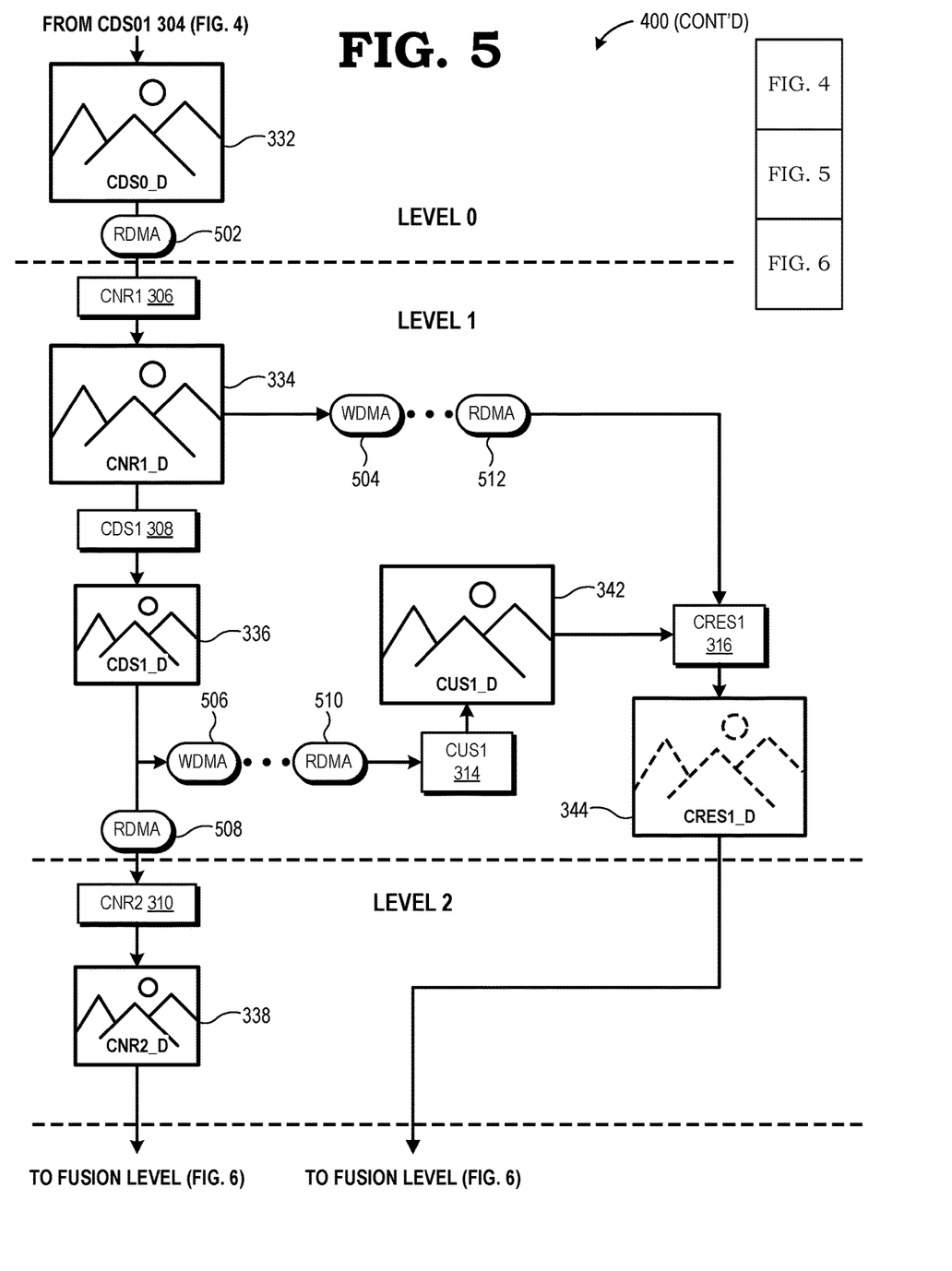
Figure 6:
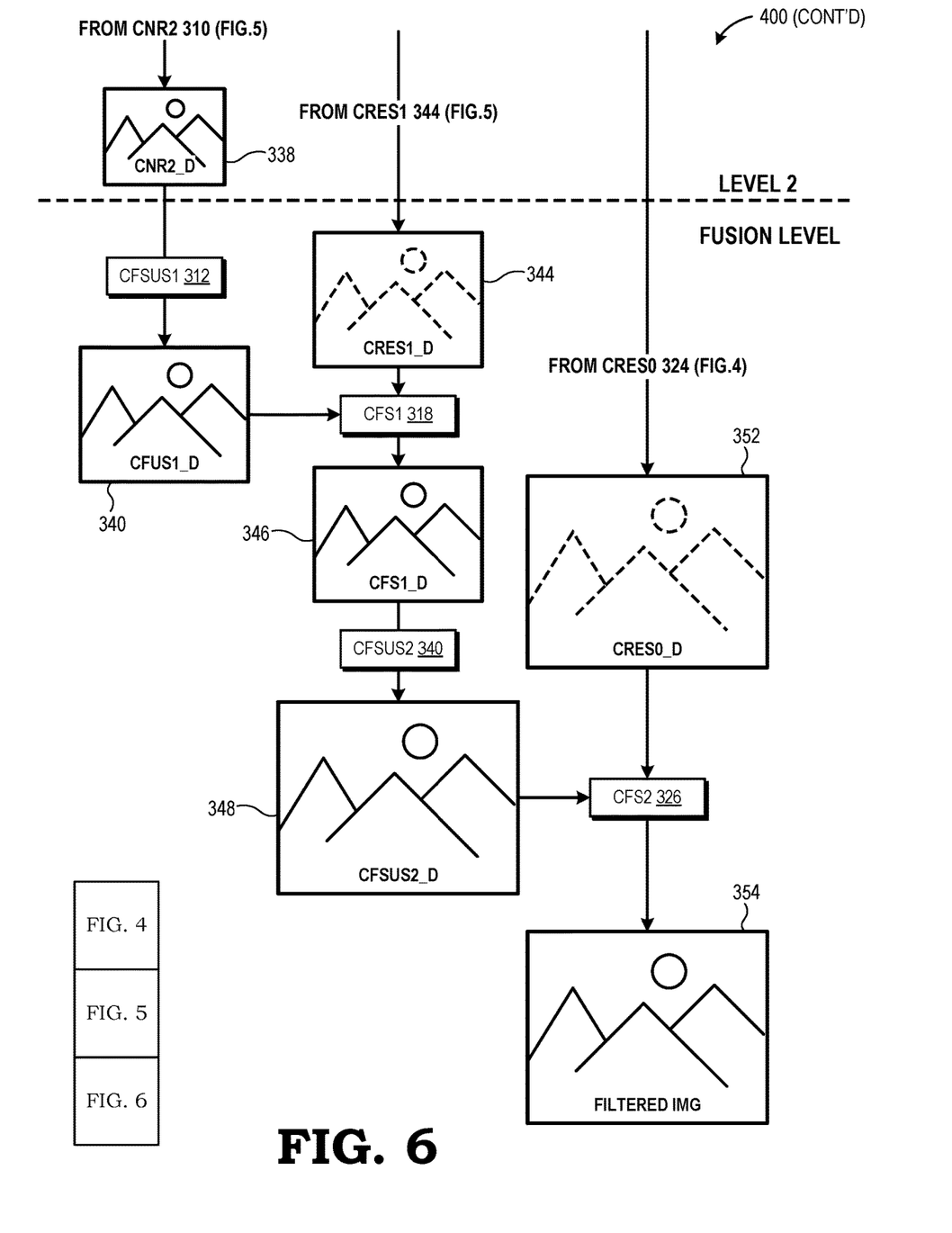

With the individual connections and operations of the functional blocks 302-326 and DMA engines 301, 303 of the hardware architecture 300 for the multiscale filtering stage 116 described, the data flow and operational flow employed using the hardware architecture 300 to implement a multi-scale filtering process 400 is illustrated by FIGS. 4-6.

Referring first to FIG. 4, at a first time slice (time T0 to T1 to T2), the chrominance image 328 representing the chrominance information of the preprocessed image 122 is input to the initial scaled filtering level, level 0, whereupon it is input to CNR0 302, which performs an NLM denoising operation or other denoising operation to generate the denoised image CNR0_D 330 (time T0 to T1). The WDMA engine 301 performs a write operation 402 to write the denoised image CNR0_D 330 to the memory 106 for subsequent access. CDS0 304 downscales the denoised image CNR0_D 330 output by CNR0 302 by the downscaling factor DS0 (e.g., 50%) to generate the downscaled image CDS0_D 332 (time T1 to T2). The WDMA engine 301 performs a write DMA operation 404 to write the downscaled image CDS0_D 332 to the memory 106 for subsequent access.

Referring briefly to FIG. 5, at a subsequent second time slice (time T2-T4), the RDMA engine 303 performs a read DMA operation 502 to access the stored downscaled image CDS0_D 332 from the memory 106 and to provide it to CNR1 306, which applies a denoise operation to the downscaled image CDS0_D 332 (time T2 to T3) to generate the denoised image CNR1_D 334. The WDMA engine 301 performs a write DMA operation 504 to buffer the denoised image CNR1_D 334 in the memory 106. CDS1 308 then downscales the denoised image CNR1_D 334 output by CNR1 306 by the downscaling factor DS1 (e.g., another 50%) to generate the downscaled image CDS1_D 336 (time T3-T4), and the WDMA engine 301 performs a write DMA operation 506 to buffer the downscaled image CDS1_D 336 in the memory 106.

At a subsequent third time slice (T4-T5), the RDMA engine 303 performs a read DMA operation 508 to access the downscaled image CDS1_D 336 from the memory 106 and to provide the accessed downscaled image CDS1_D 336 to CRN2 310 at the intermediate scaled filtering level (level 2). CRN2 310 performs an NLM denoising operation (or other denoising operation) to generate the denoised image CNR2_D 338.

Referring briefly to FIG. 6, at a subsequent fourth time slice (T5-T6), the denoised image CNR2_D 338 is provided to the fusion level, whereupon CFSUS1 312 performs an upscale operation using upscaling factor FUS1 to upscale the denoised image CNR2_D 338 to generate the upscaled image CFSUS1_D 340. Referring back to FIG. 5, during this same time slice the RDMA engine 303 performs a read DMA operation 510 to access the stored downscaled image CDS1_D 336 from memory 106 and provides it to CUS1 314, which performs an upscale operation using upscaling factor US1 to upscale the downscaled image CDS1_D 336 to generate the upscaled image CUS1_D 342 having the same resolution as the upscaled image CFSUS1_D 340, and the upscaled image CUS1_D 342 is input to CRES1 316. Concurrently, the RDMA engine 303 performs a read DMA operation 512 to access the denoised image CNR1_D 334 from memory 106 and provides it as an input to CRES1 316. CRES1 316 then subtracts the upscaled image CUS1_D 342 from the denoised image CNR1_D 334 to generate the residue image 344. Returning to FIG. 5, during this same time slice, the upscaled image CFSUS1_D 340 and the residue image CRES1_D 344 are input to CFS1 318, which superimposes, or "fuses", these input images to generate the fused image CFS1_D 346.

Referring again to FIG. 6, at a subsequent fifth time slice (time T6-T7), the output fused image CFS1_D 346 is input to CFSUS2 340, which performs an upscale operation to upscale fused image CFS D 346 by an upscale factor FUS1 to generate the upscaled image CFSUS2_D 348 having the original resolution OR of the chrominance image 328. Returning to FIG. 4, concurrently in the fifth time slice (T6-T7), the WDMA engine 301 performs a read DMA operation 406 to access the stored downscaled image CDS0_D 332 from the memory 106 and provides the downscaled image CDS0_D 332 to CUS0 332, which performs an upscale operation to upscale the image CDS0_D 332 by an upscale factor US0 to generate the upscaled image CUS0_D 350 having the same resolution as the original resolution OR of the chrominance image 328.

For a sixth and final time slice (time T7-T8), the RDMA engine 303 performs a read DMA operation 408 to access the denoised image CNR0_D 330 from the memory 106 and provides the accessed image to the input of CRES0 324. CRES0 324 subtracts the upscaled image CUS0_D 350 from the accessed denoised image CNR0_D 330 to generate the residue image CRES0_D 352. Referring again to FIG. 6, the residue image CRES0_D 352 and the upscaled image CFSUS2_D image are input to CFS2 326 at the fusion level, and CFS2 326 performs a superposition operation to superimpose the residue image CRES0_D 352 on the upscaled image CFSUS2_D 348 to generate the output filtered chrominance image 354.

Thus, as shown above, the multiscale filtering process 400 and the hardware architecture 300 implementing this process together provide for low-latency, full-frequency image filtering using temporary DMA-based storage and subsequent access of the intermediate images from memory in the end-to-end flow to provide improved latency and bandwidth. In the embodiment described above, the number of images in the multiscale full-frequency filtering processes—include three denoised images, two downscaled images, two residual images, four upscaled images and two fusion images, with the last of these fusion images acting as the final output. Using the architecture and processes described above, only two downscaled images and two denoised images are stored, which provides for a relatively small amount of data to store and access from memory, leading to significantly reduced memory bandwidth requirements. Moreover, the intermediate images are processed by the next level immediately after being generated at the current level. As such, the latency primarily depends on the filter window size of the noise-reduction, downscale, and upscale processes, as well as memory latency, and thus resulting in lower latency overall compared to conventional approaches.

In some embodiments, the apparatus and techniques described above are implemented in a system including one or more integrated circuit (IC) devices (also referred to as integrated circuit packages or microchips), such as the SOC 102 described above with reference to FIGS. 1-6. Electronic design automation (EDA) and computer-aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices to perform at least a portion of a process to design or adapt a manufacturing system to fabricate the circuitry. This code can include instructions, data, or a combination of instructions and data. The software instructions representing a design tool or fabrication tool typically are stored in a computer-readable storage medium accessible to the computing system. Likewise, the code representative of one or more phases of the design or fabrication of an IC device may be stored in and accessed from the same computer-readable storage medium or a different computer-readable storage medium.

A computer-readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

Note that not all the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for denoising an image, the method comprising:
   receiving an input image; and
   performing a multiscale filtering process on the input image to generate a filtered image, wherein the multiscale filter process includes, for one or more resolution scales of a plurality of different resolution scales;
      denoising an image at a different resolution scale of the plurality of different resolution scales to produce a denoised image;
      downscaling the denoised image to produce a downscaled image;
      upscaling the downscaled image to produce an upscaled image; and
      fusing the upscaled imaged with the denoised image.

2. The method of claim 1, wherein the multiscale filtering process includes, for a resolution scale of the plurality of different resolution scales: temporarily buffering the denoised image at a memory using direct memory access (DMA) operations.

3. The method of claim 2, wherein each operation at a corresponding resolution scale of the plurality of different resolution scales is performed by corresponding separate functional block of a hardcoded hardware architecture of a system on a chip (SOC) coupled to the memory, the hardware architecture including at least one DMA engine.

4. The method of claim 1, further comprising: displaying the filtered image.

5. A method for multiscale noise filtering of an image, the method comprising: receiving an input image to be filtered;
   recursively performing, for each level of a plurality of levels in a first sequence, a denoising operation on an image received from a previous level in the first sequence followed by a downsampling operation on a resulting denoised image, followed by an upsampling operation on a resulting downsampled image, and then followed by a residue operation that subtracts a resulting upsampled image at the level from the denoised image at the level to generate a residue image for the level; and
   recursively performing, for each level of the plurality of levels in a second sequence opposite of the first sequence, an upscaling operation to upscale a fused image of a previous level, followed by a fusion operation to combine a resulting upscaled fused image with the residue image of a next level in the second sequence to generate a fused image for the level; and
   providing a resulting final fused image as a filtered image for at least one of storage, display, transmission, or encoding.

6. The method of claim 5, wherein, for a level of the plurality of levels in the first sequence, the method includes:
   receiving an output image from a previous level in the first sequence;
   performing a denoising operation to generate a denoised image;
   downsampling the denoised image to generate a downsampled image;

providing the downsampled image as an output image to the next level in the first sequence;

upsampling the downsampled image to generate an upsampled image; and subtracting the upsampled image from the denoised image to generate a residue image for the level.

7. The method of claim 6, wherein, for a level of the plurality of levels in the first sequence, the method further includes:

storing the denoised image of the level to a memory using at least one direct memory access operation;

storing the downsampled image of the level to the memory using at least one direct memory access operation;

accessing the downsampled image of the level from the memory using at least one DMA operation for use in upsampling the downsampled image to generate the upsampled image; and accessing the denoised image for the level from the memory using at least one DMA operation for use in subtracting the upsampled image from the denoised image.

8. The method of claim 7, wherein receiving the output image from a previous level comprises accessing the denoised image of the previous level from the memory using at least one DMA operation, the accessed denoised image being the output image from the previous level.

9. The method of claim 8, wherein each operation performed at each level of the plurality of levels is performed by corresponding separate functional block of a hardcoded hardware architecture of a system on a chip (SOC) coupled to a memory, the hardware architecture including at least one DMA engine to perform DMA operations for the functional blocks of the hardcoded hardware architecture.

10. The method of claim 8, wherein, for a level of the plurality of levels in the second sequence, the method includes:

upscaling a fused image from a previous level in the second sequence to generate an upscaled fused image; and combining the upscaled fused image with the residue image of the level to generate a fused image for use at a next level in the second sequence.

11. The method of claim 6, wherein, for a level of the plurality of levels in the second sequence, the method includes:

upscaling a fused image from a previous level in the second sequence to generate an upscaled fused image; and combining the upscaled fused image with the residue image of the level to generate a fused image for use at a next level in the second sequence.

12. The method of claim 5, wherein the input image is a chrominance image of an image.

13. An image processing system comprising:

an input to receive an input image; and a multiscale filtering circuitry configured to perform a multiscale filtering process on the input image to generate a filtered image, wherein the multiscale filtering process includes, for one or more resolution scales of a plurality of different resolution scales;

denoising an image at a different resolution scale of the plurality of different resolution scales to produce a denoised image;

downscaling the denoised image to produce a downscaled image;

upscaling the downscaled image to produce an upscaled image; and fusing the upscaled imaged with the denoised image.

14. The image processing system of claim 13, further comprising:

a memory coupled to the multiscale filtering circuitry; and wherein the multiscale filtering circuitry includes at least one direct memory access (DMA) engine to temporarily buffer, for a resolution scale of the plurality of different resolution scales, the denoised image at the memory.

15. The image processing system of claim 14, wherein each operation at a corresponding resolution scale of the plurality of different resolution scales is performed by a corresponding separate functional block of a hardcoded hardware architecture of a system on a chip (SOC) coupled to the memory.

16. The image processing system of claim 13, further comprising:

an imaging camera connected to the input and configured to capture an image of a scene, wherein the input image is a chrominance portion of the image captured by an imaging camera.

17. The image processing system of claim 13, further comprising:

an output coupleable to a display for providing the filtered image for display.

18. An image processing system for multiscale filtering of an image, the image processing system comprising:

an input to receive an input image to be filtered; and a system on a chip (SoC) having a hardware architecture implementing a set of hardware functional blocks configured to:

recursively perform, for each level of a plurality of levels in a first sequence, a denoising operation on an image received from a previous level in the first sequence followed by a downsampling operation on a resulting denoised signal, followed by an upsampling operation on a resulting downsampled image, and then followed by a residue operation that subtracts a resulting upsampled image at the level from the denoised image at the level to generate a residue image for the level; and recursively perform, for each level of the plurality of levels in a second sequence opposite of the first sequence, an upscaling operation to upscale the denoised image of the level, followed by a fusion operation to combine a resulting upscaled image with the residue image of the next level in the second sequence; and provide a resulting filtered image for at least one of storage, transmission, or encoding.

19. The image processing system of claim 18, wherein, for a level of the plurality of levels in the first sequence, the set of hardware functional blocks is configured to:

receive an output image from a previous level in the first sequence;

perform a denoising operation to generate a denoised image;

downsample the denoised image to generate a downsampled image;

provide the downsampled image as an output image to the next level in the first sequence;

upsample the downsampled image to generate an upsampled image; and subtract the upsampled image from the denoised image to generate a residue image for the level.

20. The image processing system of claim 19, wherein, for a level of the plurality of levels in the first sequence, the set of hardware functional blocks is configured to:
- store the denoised image of the level to a memory using at least one direct memory access (DMA) operation by a DMA engine;
- store the downsampled image of the level to the memory using at least one direct memory access operation by a DMA engine;
- access the downsampled image of the level from the memory using at least one DMA operation by a DMA engine for use in upsampling the downsampled image to generate the upsampled image; and
- access the denoised image for the level from the memory using at least one DMA operation by a DMA engine for use in subtracting the upsampled image from the denoised image.

21. The image processing system of claim 20, wherein the set of hardware functional blocks is configured to receive the output image from a previous level by accessing the denoised image of the previous level from the memory using at least one DMA operation of a DMA engine, the accessed denoised image being the output image from the previous level.

22. The image processing system of claim 19, wherein, for a level of the plurality of levels in the second sequence, the set of hardware functional blocks is configured to:
- upscale a fused image from a previous level in the second sequence to generate an upscaled fused image; and
- combine the upscaled fused image with the residue image of the level to generate a fused image for use at a next level in the second sequence.

23. The image processing system of claim 18, further comprising:
- an imaging camera connected to the input and configured to capture an image of a scene, wherein the input image is a chrominance portion of the image captured by an imaging camera.

* * * * *